(12) United States Patent
Kalinowski (10) Patent No.: US 12,222,501 B1
(45) Date of Patent: Feb. 11, 2025

(54) HEAD-MOUNTED DISPLAY SYSTEMS WITH BENDABLE FRAMES

(71) Applicant: Apple Inc., Cupertino, CA (US)

(72) Inventor: David A. Kalinowski, Davis, CA (US)

(73) Assignee: Apple Inc., Cupertino, CA (US)

( * ) Notice: Subject to any disclaimer, the term of this patent is extended or adjusted under 35 U.S.C. 154(b) by 385 days.

(21) Appl. No.: 17/238,768

(22) Filed: Apr. 23, 2021

Related U.S. Application Data

(60) Provisional application No. 63/037,521, filed on Jun. 10, 2020.

(51) Int. Cl.
  *G02B 27/01* (2006.01)
  *G02C 5/22* (2006.01)
  *G02C 11/00* (2006.01)

(52) U.S. Cl.
  CPC .......... *G02B 27/0172* (2013.01); *G02C 5/22* (2013.01); *G02C 11/10* (2013.01); *G02B 2027/0178* (2013.01); *G02C 2200/26* (2013.01)

(58) Field of Classification Search
  CPC ........ G02B 27/0172; G02B 2027/0178; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0123; G02B 2027/0121; G02B 2027/0125; G02B 2027/0127; G02B 2027/0129; G02B 2027/013; G02B 2027/0132; G02B 2027/0134; G02B 2027/0136; G02B 2027/0138; G02B 2027/0141; G02B 2027/014; G02B 2027/0143; G02B 2027/0145; G02B 2027/0147;
  (Continued)

(56) References Cited

U.S. PATENT DOCUMENTS 7,969,657 B2    6/2011   Cakmakci et al.
9,097,890 B2    8/2015   Miller et al.
(Continued)

FOREIGN PATENT DOCUMENTS

WO    WO-2019018396 A1 *  1/2019  ......... G02B 27/0101

*Primary Examiner* — Henry Duong
(74) *Attorney, Agent, or Firm* — Treyz Law Group, P.C.; G. Victor Treyz; Jinie M. Guihan (57) ABSTRACT

A head-mounted device may have a head-mounted support structure. The head-mounted support may support optical systems. The optical systems may be display systems that provide images to eye boxes. A user may view images from the display systems when the user's eyes are located in the eye boxes. The head-mounted support structure is bent due to pressure from a user's head while the head-mounted support structure is being worn by the user. Spring hinges or other structures may be used to supply a constant bending force to the head-mounted support structure over a range of head sizes. When the head-mounted support structure is in an unbent configuration, the images will be misaligned with respect to the eye boxes and each other. When the head-mounted support structure is being worn and the head-mounted support structure is being bent, the images will be aligned satisfactorily.

20 Claims, 8 Drawing Sheets

(58) Field of Classification Search
CPC ...... G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02C 5/22; G02C 11/10; G02C 2200/26
USPC .......................................................... 359/630
See application file for complete search history.

(56) References Cited

U.S. PATENT DOCUMENTS

| | | |
|---|---|---|
| 9,223,134 B2 | 12/2015 | Miller et al. |
| 2013/0242555 A1 | 9/2013 | Mukawa |
| 2014/0285520 A1 | 9/2014 | Park et al. |
| 2016/0026253 A1 | 1/2016 | Bradski et al. |
| 2016/0048025 A1* | 2/2016 | Cazalet .............. G02B 27/0176 351/116 |
| 2017/0038594 A1* | 2/2017 | Kartal ................ G02B 27/0176 |
| 2018/0180883 A1 | 6/2018 | Tuli |
| 2019/0129182 A1* | 5/2019 | Hu ........................ G06F 3/011 |
| 2020/0233213 A1* | 7/2020 | Porter ................ H04N 13/398 |

* cited by examiner

HEAD-MOUNTED DISPLAY SYSTEMS WITH BENDABLE FRAMES

This application claims the benefit of provisional patent application No. 63/037,521, filed Jun. 10, 2020, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. A left display system may be used in displaying a left image for a user's left eye and a right display system may be used in displaying a right image for a user's right eye.

SUMMARY

A head-mounted device may have a head-mounted support structure. The head-mounted support may support optical systems. The optical systems may be display systems that provide images to eye boxes. Satisfactory alignment between the images and the eye boxes may help enhance image quality and viewing comfort.

In an illustrative configuration, the head-mounted device is a pair of glasses having a frame that supports transparent lenses in front of a user's face. A pair of hinges couples left and right temples to left and right sides of the frame.

The display systems may have projectors, waveguides, and optical couplers for directing left and right images to left and right eye boxes, respectively. For example, output couplers may be located on the left and right transparent lenses to direct images that are traveling within the waveguides towards the eye boxes. During operation, a user may view content from the display systems when the user's eyes are located in the eye boxes.

The frame may have a nose bridge portion that bends under pressure from a user's head while the glasses are being worn by the user. Spring hinges or other structures may be used to supply a constant bending force from the temples to the frame over a range of head sizes. When the nose bridge is in an unbent configuration, the images from the display systems are misaligned with respect to the eye boxes. When the glasses are being worn and the frame is being bent, the images are aligned with respect to the eye boxes.

DETAILED DESCRIPTION

Head-mounted devices include head-mounted support structures that allow the devices to be worn on the heads of users. Head-mounted devices may include input-output devices for gathering input and supplying a user with output. For example, head-mounted devices may include displays for presenting a user with visual content. The displays may include a left display that is configured to display a left image to a left eye box and a right display that is configured to display a right image to a right eye box. To help ensure that the left and right images are satisfactorily aligned, the head-mounted support structure may be configured to flex by a predetermined amount when worn.

Figure 1:
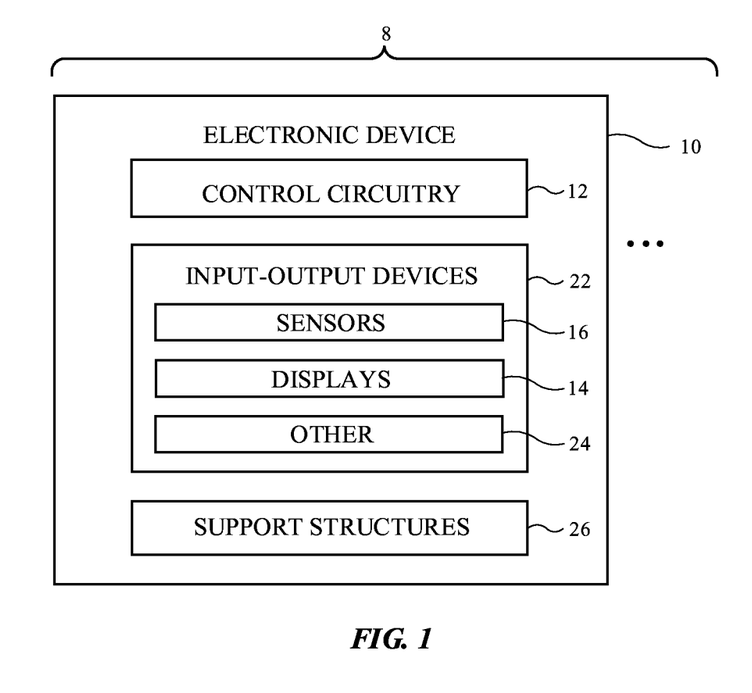
FIG. 1 is a schematic diagram of an illustrative electronic device such as a head-mounted display device in accordance with an embodiment.

A schematic diagram of an illustrative system that may include a head-mounted device is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example. Head-mounted devices may include goggles, helmets, glasses, and/or other equipment that may be worn over a user's eyes. Illustrative configurations in which electronic device 10 is a head-mounted device such as a pair of glasses may sometimes be described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more optional displays such as displays 14. In some configurations, device 10 includes left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or other left and right display devices that provide images to left and right eye boxes for viewing by the user's left and right eyes, respectively.

Displays 14 may be used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles with an opaque display). In other configurations, an optical coupling system may be used to allow computer-generated content to be optically overlaid on top of a real-world image. As an example, device 10 may have a see-through display system that provides a computer-generated image to a user through a beam splitter, prism, holographic coupler, or other optical coupler while allowing the user to view real-world objects through the optical coupler.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have housing structures, as shown by illustrative support structure(s) 26 of FIG. 1. Structure 26 may be, for example, a head-mounted support structure. A head-mounted support structure may support displays 14, sensors 16, other components 24, other input-output devices 22, and control circuitry 12 and may be configured to be worn on a head of a user so that images produced by displays 14 are directed towards the user's eyes.

Figure 2:
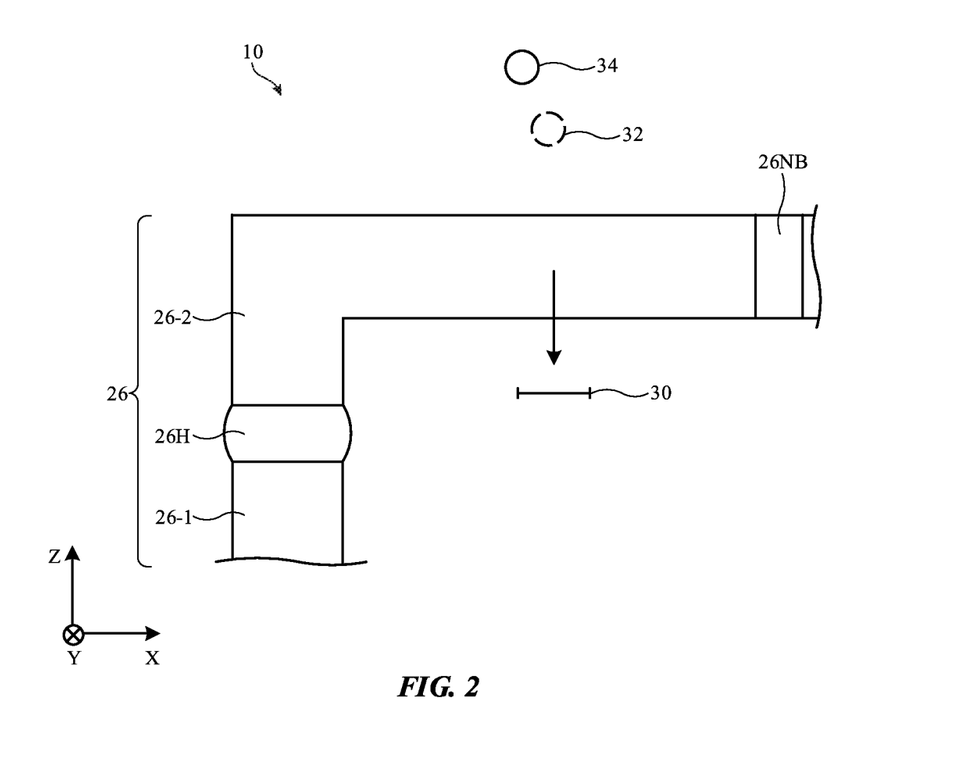
FIG. 2 is a top view of a portion of an illustrative head-mounted device in accordance with an embodiment.

FIG. 2 is a top view of a portion of electronic device 10 in an illustrative configuration in which electronic device 10 is a head-mounted device. As shown in FIG. 2, electronic device 10 may include head-mounted support structure 26 to house the components of device 10 and to support device 10 on a user's head. Support structure 26 may include, for example, structures that form housing walls and other structures at the front of device 10 such as front support structure 26-2 and structures formed along the sides of a users' face such as side support structures 26-1. Front support structure 26-2, which may sometimes be referred to as forming a frame, a glasses frame, a front frame portion, a front support, a front portion of structure 26, or a front support member, spans the front of a user's face, overlapping and covering a left eye box (see, e.g., eye box 30 of FIG. 2) and a right eye box. During use of device 10, when device 10 is being worn on a head of a user, the user's left eye is located in the left eye box and the user's right eye is located in the right eye box.

As shown in FIG. 2, front support structure 26-2 may include a nose bridge portion such as nose bridge 26NB that is configured to be supported on the nose of the user. Nose bridge portion 26NB may couple together left and right halves of structure 26-2. Side support structures 26-1, which may sometimes be referred to as side frame portions, temples, or elongated side support members, may be coupled respectively to the left and right sides of the front frame portion by respective left and right hinges 26H. Structures 26-1 help to hold the rest of structure 26 and the components supported by structure 26 on a user's face. In this arrangement, images may be viewed by the user when the user's eyes are located within eye boxes (eye locations) such as eye box 30. Side support structures 26-1 may have elongated shapes with curved ends that receive the user's ears when device 10 is worn on the head of the user.

During operation of device 10, display systems in device 10 may present images to a user's eyes in eye boxes 30. Eye boxes 30 include a left eye box (e.g., eye box 30 of FIG. 2) that receives a left image and a right eye box on the right side of device 10 that receives a right image. Device 10 may include a left display system that presents the left image to the left eye box and a right display system that presents the right image to the right eye box. In an illustrative configuration, device 10 has left and right transparent lenses in front of the user's eyes and has left and right display systems that each have an optical combiner assembly that helps combine a display image (e.g., computer-generated image 32 of FIG. 2, sometimes referred to as a virtual image) with real-world image light (e.g., light from real-world objects such as object 34 of FIG. 2). Optical combiner assemblies may include optical couplers, waveguides, and/or other components.

Figure 3:
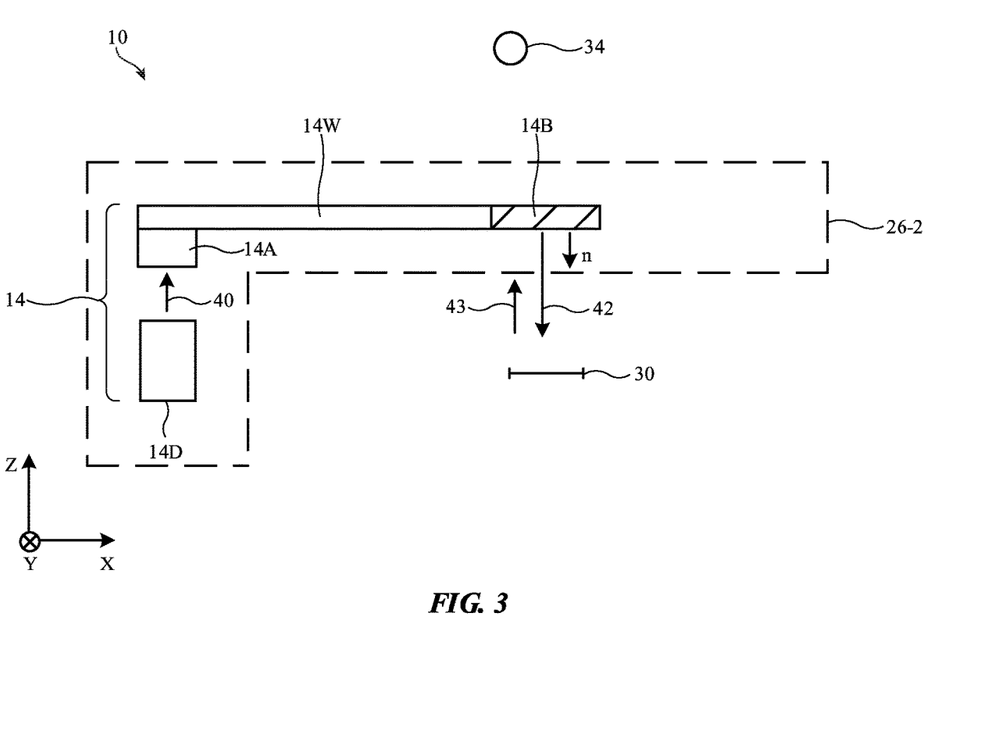
FIG. 3 is a top view of an illustrative display system for a head-mounted device in accordance with an embodiment.

FIG. 3 is a top view of a left portion of front frame portion 26-2 with an illustrative display system (display 14). In the example of FIG. 3, display 14 includes display device 14D, input coupler 14A, waveguide 14W, and output coupler 14B. Display device 14D may be, as an example, a projector such as a scanning mirror device or other device that supplies an image for the user's left eye. Image light 40 from display device 14D may be supplied to input coupler 14A, which couples light 40 into waveguide 14W. Waveguide 14W may be supported by and/or incorporated into a transparent lens that is held in place in front of the user's eye and eye box 30 by support 26-2. Input coupler 14A may be a prism, holographic input coupler, grating, and/or other input coupler that is configured to couple image light from device 14D into waveguide 14W. Waveguide 14W may be formed from a layer of transparent material (e.g., polymer, glass, etc.) that is configured to convey the image light from device 14D laterally (in the +X direction of FIG. 3) towards the center of the front frame portion while allowing a user with an eye in eye box 30 to view real-world objects such as object 34 in direction 43.

The image light received is guided within waveguide 14W in accordance with the principal of total internal reflection. Output coupler 14B, which may be formed as part of waveguide 14W and/or may be mounted on the surface of waveguide 14W, overlaps eye box 30. When the image light being guided in waveguide 14W reaches output coupler 14B, this light is coupled out of waveguide 14W and is provided to eye box 30 as an image for viewing in by the user, as shown by image light 42 of FIG. 3. The direction in which image light 42 travels out of waveguide 14W toward eye box 30 may be parallel to surface normal n of waveguide 14W or may be slightly angled with respect to waveguide 14W (e.g., in configurations in which the left and right waveguides of device 10 are angled slightly so that they extend parallel to the left and right surfaces of the user's face, respectively).

Device 10 is configured so that optimum viewing of the left and right images from the left and right displays of device 10 is obtained when the user's eyes are located in the left and right eye boxes. If support structure 26 is not configured properly as device 10 is being worn, the directions in which images are supplied by the display system to the user will deviate from their intended directions. For example, the left image will not be aligned with the left eye box and/or the right image will not be aligned with the right eye box. When the left and right images are not aligned satisfactorily with respect to eye boxes 30 and are therefore not aligned satisfactorily with respect to each other, the user may experience viewing discomfort and/or may view distorted images. Satisfactory alignment and good viewing conditions may be obtained when the left and right images are aligned with respect to each other and eye boxes 30 within a tolerance of less than 1°, less than 0.5°, less than 0.2°, less than 0.1°, or other suitable tolerance.

In an illustrative configuration, support structure 26-2 is configured to flex outwardly by a predetermined amount (e.g., less than a few degrees or other suitable amount) when device 10 is being worn by a user. The left and right display systems supported by the left and right sides of support structure 26-2 are configured so that under these slightly flexed conditions, the left and right images that are coupled out of the left and right waveguides are aligned satisfactorily with each other and with eye boxes 30. By accounting for a slight amount of expected bending of support structure 26 and by configuring structure 26 so that this amount of bending is well controlled and quantified in advance, image misalignment that might otherwise occur due to unknown amounts of bending can be avoided. At the same time, the overall size and weight of device 10 can remain satisfactorily low (e.g., excessively heavy and stiff frame structures need not be used in forming device 10 in an attempt to avoid all bending).

Figure 4:
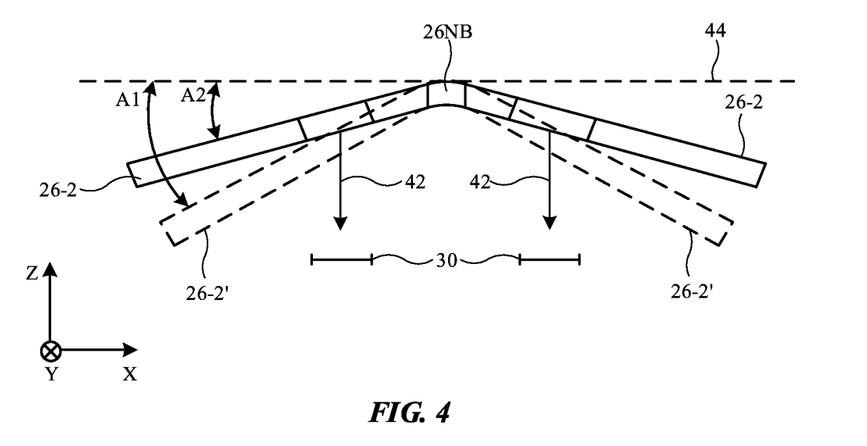
FIG. 4 is a top view of an illustrative frame that is configured to flex when worn in accordance with an embodiment.

FIG. 4 is a top view of device 10 showing how the amount of bending experienced by support structure 26-2 may change when device 10 is worn on the head of user. Initially, before device 10 is being worn on a user's head, support structure 26-2 may be located where shown by structure 26-2' of FIG. 4. Each half of structure 26-2' may, for example, be oriented at an angle A1 with respect to the horizontal axis 44 (which is parallel to the X axis in the example of FIG. 4). When device 10 is being worn on a user's head, outward pressure from the sides of the user's head will press support structures 26-1 away from each other. On the left, the left side of the user's head will press leftward on the left support structure 26-1 of device 10. This will tend to cause a clockwise rotation of the left support structure 26-1 about the left hinge 26H (when viewed from above as in FIG. 4) and will tend to move the left end of the left half of support structure 26-2 outwards (in the +Z direction of FIG. 4). Due to the presence of nose bridge 26HB, which flexes under stress, the outward movement of the left end of the left half of support structure 26-2 causes the left half of support structure 26-2 to rotate to an angle A2 with respect to horizontal axis 44. On the right, the right side of the user's head will likewise cause the right support structure 26-1 to move outwardly and will cause the right half of support structure 26-2 to rotate (counterclockwise) about nose bridge 26NB to an angle A2 with respect to axis 44.

Displays 14 (e.g., output couplers 14B) may be configured so that when support structure 26-2 has been bent slightly about nose bridge portion 26NB to angular orientations A2 with respect to axis 44, image light 42 corresponding to the left and right images is aligned, respectively, with the left and right eye boxes 30 of device 10. By precharacterizing the amount of expected bending of structure 26-2 when device 10 is being worn and by configuring the displays of device 10 so that they are not aligned with eye boxes 30 when structure 26-2 is unbent, but are aligned with eye boxes 30 when structure 26-2 is bent by the predetermined amount, device 10 can be operated satisfactorily (with left and right images in alignment with each other and eye boxes 30) whenever device 10 is worn by a user.

To help ensure that the desired amount of outward flexing of the left and right sides of structure 26-2 is achieved when device 10 is being worn, hinges 26H may have spring structures that are configured to exert a known amount of rotational force on each side of structure 26-2 under a variety of different usage scenarios (e.g., when device 10 is worn by users with a variety of different head sizes and when structures 26-1 on the left and right sides of the user's head are separated by various different distances to accommodate various different head sizes).

Figure 5:
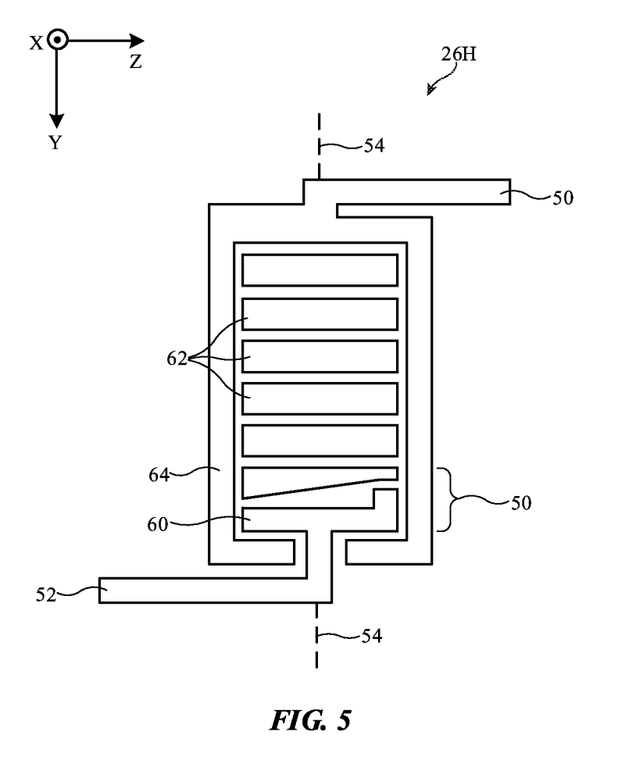
FIG. 5 is a cross-sectional side view of an illustrative hinge with a spring in accordance with an embodiment.

FIG. 5 is a cross-sectional side view of hinge 26H in an illustrative configuration in which hinge 26H is configured to exert a fixed amount of rotational force under multiple different angular orientations for support structures 26-1 relative to structure 26-2. As shown in FIG. 5, hinge may have a first portion such as portion 52 that is coupled to support structure 26-1 and a second portion such as portion 50 that is coupled to support structure 26-2. Disk-shaped member 60, which forms part of cam mechanism 56, is coupled to portion 52. Portion 50 is coupled to cylindrical hinge housing 64. Spring members 62 (e.g., frustoconical spring metal members such as Belleville washers) may be stacked within cylindrical hinge housing 64 to form a constant force hinge spring for hinge 26H. As the angular orientation between structures 26-1 and 26-2 is changed (e.g., as these structures rotate relative to each other about hinge axis 54), the angular orientation (in the XZ plane of FIG. 5) of portions 50 and 52 changes accordingly and cam mechanism 56 compresses or uncompressed spring members 62 along axis 54, depending on the direction of change of the angular orientation. Using this spring mechanism, hinges 26H may be configured to serve as constant-force hinges. In particular, hinges 26H may be configured so that a constant amount of rotational force is imposed on the left and right sides of structure 26-2 over a range of potential angular orientations for sides structures 26-1.

Figure 6:
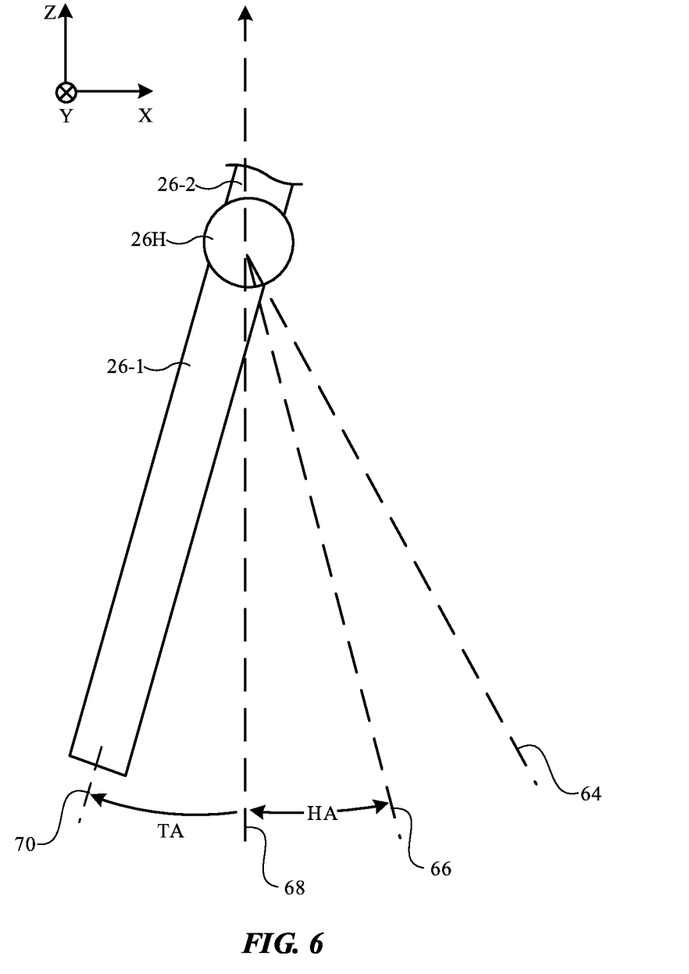
FIG. 6 is a top view of an illustrative temple and hinge for a head-mounted device in accordance with an embodiment.

Consider, as an example, the arrangement of FIG. 6. As shown in FIG. 6, support structure 26-1 (e.g., the left-hand support structure 26-1 in device 10) may be coupled to support structure 26-2 by hinge 26H. When device 10 is not being worn on the head of a user, support structure 26-1 may be in a position such as position 64. In this position, the spring of hinge 26H may not yet been compressed, and little or no resistive force may be generated by hinge 26H in response to clockwise rotation of structure 26-1. When structure 26-1 is rotated to position 66 (e.g., a position in which structure 26-1 is oriented at an angle of −HA with respect to axis 68, which is an axis aligned with the Z axis in the example of FIG. 6), spring members 62 (FIG. 5) may start to be compressed, hinge 26H may start to engage, and rotational force may start to be imposed on structure 26-2 by hinge 26H. Further rotation of structure 26-1 about hinge 26H (e.g., from position 66 to position 70, where structure 26-1 is oriented at angle TA with respect to axis 68) may continue to compress the spring structures of hinge 26H together and may continue to impose rotational force on structure 26-2.

Figure 7:
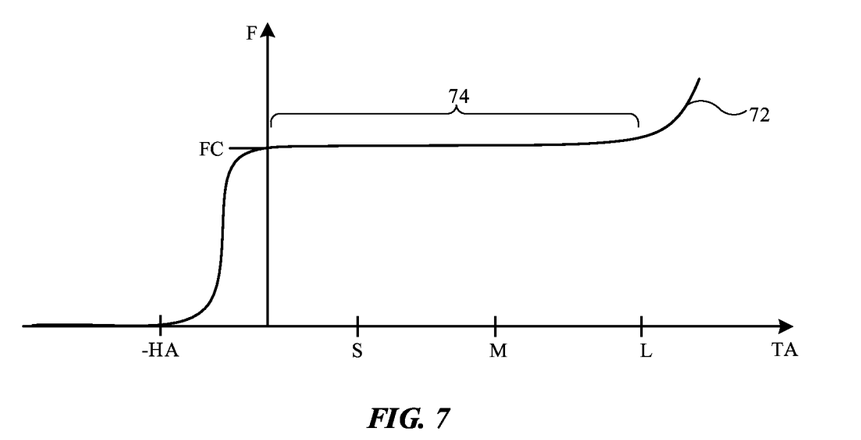
FIG. 7 is a graph showing how the force imposed on a frame may be maintained at a constant level across various amounts of temple angular deflection by using a spring system of the type shown in FIG. 5 in accordance with an embodiment.

Due to the constant-force configuration of hinge 26H, the force (e.g., clockwise rotational force) imposed by hinge 26H on the left-hand portion of structure 26-2 is constant as the left-hand structure 26-1 is moved outwardly to the left from the left side of the user's head and rotates clockwise about the left hinge 26H. This is illustrated by curve 72 in the graph of FIG. 7, in which the force F imposed on structure 26-2 by hinge 26H due to rotation of structure 26-1 has been plotted as a function of angle TA. As shown in this example, before structure 26-1 reaches position 66 (FIG. 6), the spring of hinge 26H is not engaged and there is little imposed force F. Once the spring is engaged, however, the force F that is transferred from structure 26-1 to structure 26-2 by hinge 26H is relatively constant at force level FC over a range of angles TA, as shown by portion 74 of curve 72. The range over which force F is relatively constant may cover, for example, a small angular rotation S of structure 26-1 of the type that may be experienced when device 10 is worn by a user with a small head, a medium angular rotation M of the type that that may be experienced when device 10 is worn by a user with a medium-sized head, and a large angular rotation L of the type that may be experienced when device 10 is worn by a user with a large head.

Figure 8:
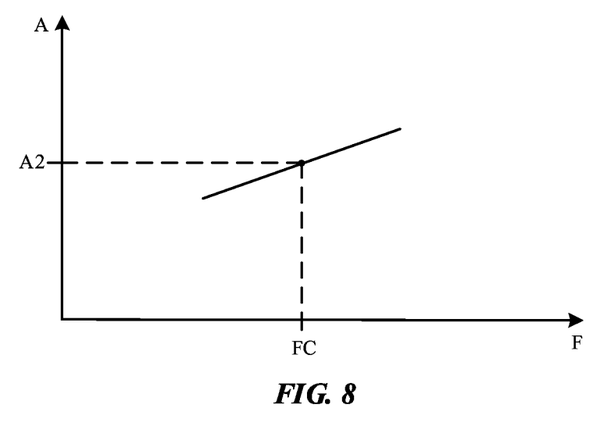
FIG. 8 is a graph showing how a head-mounted device frame may be configured to flex by a predetermined amount when worn by a user in accordance with an embodiment.

The amount of flexing that is experienced by structure 26-2 when force FC is imposed corresponds to the predetermined desired amount of flexing to properly orient the left and right display systems of device 10 with respect to each other and eye boxes 30. As shown in the graph of FIG. 8, when force F is applied to each end of structure 26-2 by a respective support structure 26-1 (using a respective constant-force hinge 26H), structure 26-2 bends about nose bridge portion 26NB and each half of structure 26-2 rotates to a corresponding angular orientation A. To achieve a desired angular orientation for each half of structure 26-2 (e.g., to achieve desired angular orientation A2 of FIG. 4), the force F that is applied to nose bridge portion 26NB should be force FC, as shown in the graph of FIG. 8. As described in connection with region 74 of curve 72 in the graph of FIG. 7, this amount of force is produced by constant force hinge 26H over a range of angular orientations (angles TA) for structure 26-1, thereby helping to ensure that structure 26-2 is bent by the desired predetermined amount about nose bridge portion 26NB, even when users with differently sized heads are wearing device 10.

Because structure 26-2 bends by a predetermined angle when worn, it is not necessary to make structure 26-2 overly large and stiff in an attempt to avoid any bending. This may help reduce the size and weight of structure 26 and device 10. Structures in device 10 (e.g., structure 26 and/or other structures) may be formed from fiber-composite materials (e.g., carbon-fiber material), polymer, metal, glass, ceramic, fabric, wood and other natural materials, and/or other materials.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
    a head-mounted support structure having a front portion with left and right halves coupled at a nose bridge portion and having left and right side portions coupled by respective left and right hinges to the left and right halves;
    a left display system coupled to the left half of the front portion and configured to produce a left image for a left eye box in a left image direction; and
    a right display system coupled to the right half of the front portion and configured to produce a right image for a right eye box in a right image direction, wherein the head-mounted support structure is configured to press the left and right side portions away from each other and to rotate the left and right halves about the nose bridge portion when the head-mounted device is worn to align the left image direction with the left eye box and the right image direction with the right eye box.

2. The head-mounted device defined in claim 1 wherein the head-mounted support structure comprises left and right support structures, wherein the left support structure comprises a left temple that is oriented at a first angle relative to the left half of the front portion, wherein the right support structure comprises a right temple that is oriented at a second angle relative to the right half of the front portion, and wherein the left and right hinges of the front portion are constant force spring hinges that are configured, when the head-mounted support structure is being worn, to impart forces to the left and right halves of the front portion that bend the left and right halves of the front portion about the nose bridge portion by a predetermined amount.

3. The head-mounted device defined in claim 2 wherein the left display system has a left display projector, a left output coupler, a left input coupler configured to receive the left image from the left display projector, and a left waveguide configured to guide the left image from the left input coupler to the left output coupler, wherein the left waveguide is mounted in the left half of the front portion and wherein the left output coupler is configured to couple the left image out of the left waveguide in the left image direction.

4. The head-mounted device defined in claim 1 wherein the nose bridge portion is configured to support the left and right halves in a first angular orientation when the head-mounted support structure is not being worn and is configured to bend to support the left and right halves in a second angular orientation that is different than the first angular orientation when the nose bridge portion is bent by a predetermined amount.

5. The head-mounted device defined in claim 1 wherein the nose bridge portion is configured to bend by a predetermined amount in response to different user head sizes, and wherein the predetermined amount is constant over a range of angular orientations of the left and right side portions.

6. The head-mounted device defined in claim 1 wherein the left and right hinges each include a spring and the springs are formed from a stack of compressible members squeezed by a cam mechanism.

7. A pair of glasses configured to display a left image for a user in a left eye box and a right image for the user in a right eye box while the user views real-world objects, the glasses comprising:
a frame having left and right portions joined by a nose bridge portion;
a left hinge;
a right hinge;
a left temple coupled to the left portion of the frame by the left hinge;
a right temple coupled to the right portion of the frame by the right hinge; and
left and right displays supported by the left and right portions respectively and configured to supply respective left and right images to left and right eye boxes, wherein the left and right hinges are configured to provide a constant force at different angular rotations of the left and right temples to press the left and right temples away from each other and to rotate the left and right portions about the nose bridge portion to align the left and right images with the left and right eye boxes, respectively.

8. The glasses defined in claim 7 wherein the left and right hinges each include a spring.

9. The glasses defined in claim 8 wherein the springs are each formed from a stack of compressible members squeezed by a cam mechanism.

10. The glasses defined in claim 7 wherein the left display has a left waveguide that overlaps the left eye box and wherein the right display has a right waveguide that overlaps the right eye box.

11. The glasses defined in claim 10 wherein the real-world objects are respectively viewable through the left and right waveguides from the left and right eye boxes.

12. The glasses defined in claim 11 wherein the left and right hinges have springs that are configured to supply the constant force to the left and right portions respectively when the left and right temples are pressed away from each other when being worn.

13. A head-mounted device configured to be worn on a user's head, the head-mounted device comprising:
left and right optical systems configured to supply a left image to a left eye box and a right image to a right eye box, respectively; and
a head-mounted support structure that supports the left and right optical systems, wherein the head-mounted support structure comprises left and right portions coupled at a nose bridge portion and left and right temples coupled by hinges to the left and right portions, wherein the head-mounted support structure is configured to be unbent when not being worn and is configured to bend under pressure from the user's head when being worn to press the left and right temples away from each other and to rotate the left and right portions about the nose bridge portion to align the left image with the left eye box and the right image with the right eye box.

14. The head-mounted device defined in claim 13 wherein the left and right portions overlap the left and right eye boxes, respectively.

15. The head-mounted device defined in claim 14 wherein the hinges comprise a left hinge coupled to the left portion and a right hinge coupled to the right portion.

16. The head-mounted support structure defined in claim 15 wherein the nose bridge portion is configured to bend when force is applied to the left portion with the left hinge and force is applied to the right portion with the right hinge.

17. The head-mounted device defined in claim 15 wherein the left and right hinges are further coupled to the left and right temples, respectively, and provide constant rotational force over a range of positions of the left and right temples portions.

18. The head-mounted device defined in claim 14 wherein the left and right optical systems comprise respective left and right display systems.

19. The head-mounted device defined in claim 18 wherein, when the head-mounted support structure is unbent, the left and right images are misaligned with respect to each other.

20. The head-mounted device defined in claim 19 wherein the left display system comprises a left display projector configured to produce the left image and the right display system comprises a right display projector configured to produce the right image.

* * * * *